US008989014B2

(12) United States Patent
Báder

(10) Patent No.: US 8,989,014 B2
(45) Date of Patent: Mar. 24, 2015

(54) METHOD FOR RESERVING CAPACITY ON A COMMUNICATION NETWORK LINK

(75) Inventor: Attila Báder, Paty (HU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 453 days.

(21) Appl. No.: 13/519,768

(22) PCT Filed: Jan. 18, 2010

(86) PCT No.: PCT/EP2010/050535
§ 371 (c)(1),
(2), (4) Date: Sep. 6, 2012

(87) PCT Pub. No.: WO2011/085822
PCT Pub. Date: Jul. 21, 2011

(65) Prior Publication Data
US 2013/0021909 A1 Jan. 24, 2013

(51) Int. Cl.
*H04L 12/54* (2013.01)
*H04L 12/913* (2013.01)
(Continued)

(52) U.S. Cl.
CPC .......... *H04L 12/5695* (2013.01); *H04L 47/724* (2013.01); *H04L 47/801* (2013.01); *H04L 47/805* (2013.01); *H04L 47/823* (2013.01); *H04L 47/825* (2013.01)
USPC .......................................... 370/237; 370/468

(58) Field of Classification Search
CPC . H04L 47/10; H04L 41/0893; H04L 47/2408; H04L 41/5003; H04L 47/822; H04W 28/24
See application file for complete search history.

(56) References Cited

U.S. PATENT DOCUMENTS

| 6,912,232 B1 | 6/2005 | Duffield et al. | |
| 2007/0201375 A1* | 8/2007 | Hallinan et al. | 370/252 |
| 2008/0317045 A1* | 12/2008 | Chen | 370/400 |

FOREIGN PATENT DOCUMENTS

WO 0128167 A1 4/2001

OTHER PUBLICATIONS

Leon-Garcia et al. "Virtual Network Resource Management for Next Generation Networks." IEEE Communications Magazine; Jul. 1, 2003; pp. 102-109; vol. 41, No. 7; IEEE Service Center, Piscataway, NJ.

(Continued)

*Primary Examiner* — Jung Park
(74) *Attorney, Agent, or Firm* — Coats & Bennett, PLLC

(57) ABSTRACT

A method for reserving capacity on a communication network link for guaranteed bit rate (GBR) and best effort (BE) traffic includes determining (s10) a dimensioned capacity $D_{GBR}$ for GBR traffic based on an expected GBR traffic load and one grade of service (GoS); determining (s20) a dimensioned capacity $D_{TOT}$ for total traffic based on $D_{GBR}$, an expected BE traffic load and one GoS; determining (s30) a reserved capacity $R_{TOT}$ for total traffic by selecting, amongst capacities available on the link, the minimum of these capacities that exceeds $D_{TOT}$; determining (s40) a reserved capacity $R_{GBR}$ for GBR traffic based on $D_{GBR}$, $D_{TOT}$ and $R_{TOT}$; reserving (s60) $R_{TOT}$ as capacity for a higher-level pipe on the link; reserving (s60) $R_{GBR}$ as capacity for a first lower-level pipe for GBR traffic within the higher-level pipe; and reserving (s70) $R_{TOT}$ as capacity for a second lower-level pipe for BE traffic within the higher-level pipe.

15 Claims, 13 Drawing Sheets

(51) Int. Cl.
*H04L 12/927* (2013.01)
*H04L 12/911* (2013.01)

(56) References Cited

OTHER PUBLICATIONS

Kompella et al. "Label Switched Paths (LSP) Hierarchy with Generalized Multi-Protocol Label Switching (GMPLS) Traffic Engineering (TE)," IETF Standard, Internet Engineering Task Force; Report rfc4206.txt [online], <URL: http://www.ietf.org/rfc/?C=N;O=D>; Oct. 1, 2005, pp. 1-14.

Blake et al. "An Architecture for Differentiated Services." IETF Standard, Internet Engineering Task Force; Report rfc2475.txt [online]; <URL: http://www.ietf.org/rfc/?C=N;O=D>; Dec. 1, 1998, pp. 1-36.

\* cited by examiner

US 8,989,014 B2

METHOD FOR RESERVING CAPACITY ON A COMMUNICATION NETWORK LINK

TECHNICAL FIELD

The present invention relates to a computer-implemented method for reserving capacity on a communication network link. The invention also relates to a computer program including instructions configured, when executed on a computer, to cause the computer to carry out such method for reserving capacity on a communication network link. The invention also relates to a computer-readable medium including such a computer program. The invention further relates to network nodes adapted for use with the above-mentioned method for reserving capacity on a communication network link. The invention yet further relates to a controller for reserving capacity on a communication network link.

BACKGROUND

The efficient use of the bandwidth of available communication links is an important concern in most communications networks. This is because radio networks and leased lines with scarce bandwidth, i.e. with limited and/or expensive bandwidth, may be used in these networks.

Furthermore, some communications networks provide multi-service transport. Such networks may for instance be IP- or Ethernet-based multi-service transport networks and, in particular, the LTE radio access network. In these networks, different traffic types share the same network resources, including the network nodes and links, at the sane time. Different requirements, notably regarding the transmission delay and call blocking rate, apply to the different types of traffic. Traffic control techniques are generally used to meet these different requirements. These techniques include packet scheduling and queuing, prioritization and call admission control. The mechanisms implementing the traffic control techniques are set up in the network nodes transporting the packets, in packet-switched communication networks.

Resource reservation includes setting up, in the network, which resources should be reserved for a particular traffic type. Resource reservation in communication networks providing multi-service transport, and, in particular, determining and providing in an efficient manner the capacity to be reserved in a network for a particular mix of traffic is a complex task. Providing capacity "in an efficient manner" means here providing capacity without wasting bandwidth, i.e. without over-dimensioning network links or without reserving, and thus paying for, much more bandwidth of a leased line than actually necessary.

Further difficulties are to estimate the resource demand of future traffic load and provide an optimum dimensioning and resource reservation for a time period.

It is desirable to improve the dimensioning and reservation methods of the prior art to increase the efficiency of network use.

SUMMARY

To meet or to at least partially meet these objectives, a computer-implemented method, a computer program, a computer-readable medium, network nodes and a controller are defined in the independent claims. Advantageous embodiments are defined in the dependent claims.

In one embodiment, a computer-implemented method is provided for reserving capacity on a communication network link for at least a guaranteed bit rate (GBR) traffic and a best effort (BE) traffic. The method includes a step of determining a dimensioned capacity, here referred to as $D_{GBR}$, for the GBR traffic based at least on an expected GBR traffic load and a grade of service. The method further includes a step of determining a dimensioned capacity, here referred to as $D_{TOT}$, for the total traffic based at least on $D_{GBR}$, an expected BE traffic load and a grade of service. The method further includes a step of determining a reserved capacity, here referred to as $R_{TOT}$, for the total traffic by selecting, amongst capacities available on the communication network link, the minimum of these capacities that exceeds $D_{TOT}$. The method further includes a step of determining a reserved capacity, here referred to as $R_{GBR}$, for the GBR traffic based at least on $D_{GBR}$, $D_{TOT}$ and $R_{TOT}$. The method further includes a step of reserving $R_{TOT}$ as capacity for a pipe, referred to here as higher-level pipe, on the communication network link. The method further includes a step of reserving $R_{GBR}$ as capacity for a first lower-level pipe for the GBR traffic within the higher-level pipe. Finally, the method includes a step of reserving $R_{TOT}$ as capacity for a second lower-level pipe for the BE traffic within the higher-level pipe.

In the method, the reserved capacity for each type of traffic is computed in a particular manner and, then, the reserved capacity is set in the routers of the network in a particular manner as well. In other words, the routers are configured in a particular manner based on the reserved capacity for each traffic type. This leads to an efficient use of the network, as will be more fully understood in view of the following.

In the present context, a capacity on a communication network link is a bandwidth, i.e. a quantity of data per unit of time, such as a number of bytes per second. Reserving a capacity for a particular traffic type on a communication network link includes configuring the network node(s) or router(s) controlling the traffic on the network link in such a manner as to specify within the network node(s) or router(s) that the particular traffic type is allowed to use a given capacity on the network link.

The GBR traffic is a first type of traffic having specific requirements. Examples of GBR traffic include the traffic involved in voice calls and video conferencing, which imply delay-critical traffic. The delay must be guaranteed. Otherwise, the service cannot be properly provided. Such traffic may be subject to admission control.

The BE traffic is a second type of traffic having specific requirements. Examples of BE traffic include internet browsing, file transfer and email transmission, wherein the delay requirements are less strict. For instance, a guaranteed minimum bit rate and a guaranteed maximum bit rate may be specified.

The dimensioned capacity is a capacity that is required to meet, from a probabilistic perspective, expected traffic load (the demand) and a target grade of service (the performance) based on a probabilistic traffic model, which may take into account measurements and/or hypotheses. The traffic model may depend on the probability distribution that the call or session arrival, the call or session duration, and other parameters (including the users' behaviour) are assumed to follow. For instance, the call or session arrivals may be assumed to follow a Poisson distribution.

The Erlang traffic model and the Engset traffic model are well-known traffic models for one type of traffic. If there is only one service type in the network, the blocking probability of the sessions for a given link capacity and service rate can be calculated by the Erlang B formula. For a multi-service network, the Kaufman-Roberts formula can be used to compute the dimensioned capacity, for a certain traffic mix, blocking targets (the target grade of service) and offered load (corresponding to the expected traffic load from the buyer or operator perspective). The Kaufman-Roberts formula or algorithm is essentially an extension of the Erlang calculation for multiple traffic types. These traffic models and formulas will not be described herewith and are assumed to be known to the skilled person (see for instance T. Bonald at al, "A Teletrafic Theory for the Internet", Tutorial of Performance 2005, October 2005, consulted in December 2009 on: http://perso.rd.francetelecom.fr/proutiere/PUB/tutorial.pdf).

The Kaufman-Roberts formula was Published independently by Kaufman (J. S. Kaufman, "Blocking in a shared resource environment", IEEE Transactions on Communications, vol. 29, No. 10, October 1981, pp. 1474-1481) and by Roberts (J. W. Roberts, "A service system with heterogeneous user requirements", in: G. Pujolle (Ed.), Performance of Data Communicating systems and their applications, North Holland, Amsterdam, 1981, pp. 423-431).

The reserved capacity is the capacity dedicated in the network (i.e., in the network node(s) or router(s) and in the links controlled by the network node(s) or router(s)) to obtain the dimensioned capacity. In the above-described method, the dimensioned capacity is obtained by computing the reserved capacity and then setting up the reserved capacities in the network by taking into account or, more precisely, making use of the traffic control infrastructure of the network elements. This leads to an efficient use of the network bandwidth.

The expected GBR traffic load and the expected BE traffic load are both defined for instance in Erlang or kbps. These expected traffic loads constitute inputs of the method.

A grade of service (GoS) is a probability of a call or session being blocked or delayed for more than a specific interval of time. In the present context, the grade of service is a blocking target, such as for instance that, with a certain degree of confidence, 99,999 of calls or sessions will not be blocked for more than 10 seconds. A grade of service (GoS) is specified for a particular service. In other words, the GoS characterizes the offered services at the session level. In contrast, the quality of service (QoS) characterizes the transport network at the packet level. The QoS specifies parameters such as maximum delay and packet loss ratio of the transported packets. The GoS and QoS usually characterize together a particular transport service in carrier grade telecommunications transport networks.

The capacities available on a communication link are those transport capacities that are offered in discrete units, for instance on a leased line or depending on the technology used for the network link.

A pipe is a logical transport channel within which the packets are subject to at the least some common traffic control policies or mechanisms. A packet is transmitted through a particular pipe depending on its characteristics, such as for instance a class, a type field or a label in the packet header. The packets that are transported in a pipe share the resources of the pipe.

A higher-level pipe is a logical transparent channel within which the packets are subject to at the least some common traffic control policies or mechanisms, but to fewer common traffic control policies or mechanisms than a lower-level pipe contained within the higher-level pipe. In other words, the lower-level pipe carries a more particular class or type of traffic being subject to more specific traffic control policies and mechanisms than the higher-level pipe.

A lower-level pipe is, from a logical and transport level perspective, included in a higher-level pipe. Two pipes at the same level can be viewed as parallel to each other.

A hierarchy of pipes is therefore provided. The deeper in the tree (i.e. the lower the pipe's level), the more specific the traffic control policies and mechanisms. The closer to the root (i.e. the higher the pipe's level), the more generic the traffic control policies and mechanisms. The root is the highest level on the tree.

In the method, a higher-level pipe is set up for the total traffic, and, within this higher-level pipe, at least two lower-level pipes are set up, one for the GBR traffic and one for the BE traffic. The pipes are bandwidth-limited and bandwidth-guaranteed.

The BE traffic is allowed to use the total bandwidth of the higher-level pipe, since the reserved capacity for the second lower-level pipe established for the BE traffic is the same as the reserved capacity for the higher-level pipe. In contrast, the GBR traffic is allowed to use less than the total bandwidth of the higher-level pipe. However, the characteristics of the first lower-level pipe established for the GBR traffic are such that the GBR traffic has priority over the BE traffic. The differences of priority are implemented by differences of characteristics, such as for instance differences in traffic control characteristics, between the first lower-level pipe for the GBR traffic and the second lower-level pipe for the BE traffic. In other words, the traffic is handled in a different manner in the two lower-level pipes.

In the method, the reserved capacity $R_{TOT}$ is larger than the dimensioned capacity $D_{TOT}$. Furthermore, the reserved capacity $R_{GBR}$ is larger than the dimensioned capacity $D_{GBR}$.

A guaranteed service, i.e. a service wherein the bit rate should be guaranteed, can therefore be provided in an efficient manner with the method of this embodiment when a mix of traffic is used in a multiservice packet-switched network. The method is particularly useful for configuring the transport network optimally when the available transport capacities are much higher than the dimensioned capacity. This occurs in many practical cases.

The invention is not limited to a mix of traffic including two types of traffic. More than two traffic types can be used. This may then for instance lead to a high-level pipe for the total traffic, two middle-level pipes including a first middle-level pipe for the GBR traffic and a second middle-level pipe for the BE traffic, and finally, within the first middle-level pipe for the GBR traffic, a first low-level pipe for a first type of GBR traffic and a second low-level pipe for a second type of GBR traffic different from the first type of GBR traffic.

In one embodiment, the reserved capacity $R_{GBR}$ is computed to be equal to $D_{GBR} \cdot R_{TOT}/D_{TOT}$, i.e. $D_{GBR}$ multiplied by $R_{TOT}$ divided by $D_{TOT}$. In another embodiment, the reserved capacity $R_{GBR}$ is computed to be substantially equal to $D_{GBR} \cdot R_{TOT}/D_{TOT}$, wherein "substantially equal" means with a 10 percent margin but provided that $R_{GBR} > D_{GBR}$, i.e. $R_{GBR}$ is larger than $D_{GBR}$.

In one embodiment, the method is such that the higher-level pipe is a higher-level label switched path. In this context, a label switched path (LSP) is a sequence of routers configured for routing packets each including at least one label. A label of a packet is an identifier physically contiguous to the packet and identifying a forwarding equivalence class to which the packet belongs. Furthermore, a forwarding equivalence class is a group of packets that are forwarded in the same manner. Furthermore, the first lower-level pipe is a first lower-level LOT for GBR traffic and the second lower-level pipe is a second lower-level LSP for BE traffic.

The LSPs may be those defined in the Multiprotocol Label Switch (MPLS) architecture (see E. Rosen et al, "Multiprotocol Label Switching Architecture", The Internet Society, Network Working Group, RFC 3031, January 2001). MPLS is a protocol-independent data carrying mechanism for packet-switched networks. From the label edge routers (LER), which form the entry and exit points of an MPLS network, routing is carried out based on a label stack included in the MPLS header.

The capacity reservation in the routers may be carried out in accordance with RSVP-TE, wherein RSVP stands for Resource Reservation Protocol and TE stands for Traffic Engineering (see D. Awduche et al, "RSVP-TE: Extensions to RSVP for LSP Tunnels", The Internet Society, Network Working Group, RFC 3209, December 2001). In other words, the capacity reservation may be performed by establishing LSPs in MPLS networks. The LSPs may be created and configured using the RSVP-TE protocol. The LSPs may alternatively be created and configured using a network management system.

The hierarchy of higher-level and lower-level LSPs may be created in accordance with RFC 4206 (see K. Kompella et al, "Label Switched Paths (LSP) Hierarchy with Generalized Multi-Protocol Label Switching (GMPLS) Traffic Engineering (TE)", The Internet Society, Network Working Group, RFC 4206, October 2005). This may be performed by nesting of LSPs originated by other label switching routers (LSRs) into a LSP, by using the label stack construct.

In one embodiment, the method is such that the higher-level pipe is an aggregated DiffServ pipe. Furthermore, the first lower-level pipe is a DiffServ pipe for GBR traffic within the aggregated DiffServ pipe; and the second lower-level pipe is a DiffServ pipe for BE traffic within the aggregated DiffServ pipe.

DiffServ enables to provide service differentiation in an IP network. In DiffServ networks, the transported packets are marked or can be marked in the header by different DiffServ code-points (DSCP). Based on a service level agreement, DiffServ networks handle the packets marked with different code points in a different manner. The settings in the routers are established by a network management system.

DiffServ is described for instance in S. Blake et al, "An Architecture for Differentiated Services", RFC 2475, December 1998, and K. Nichols et al, "Definition of the Differentiated Services Field (DS Field) in the IPv4 and IPv6 Headers", RFC 2474, December 1998.

A DiffServ pipe is a route or set of routes through a network for transporting packets of a particular DiffServ traffic class or set of classes.

An aggregated DiffServ pipe is a DiffServ pipe including one or more DiffServ pipe. That is, an aggregated DiffServ pipe is a route or set of routes for transporting packets belonging to a particular set of traffic classes or code points. A lower-level DiffServ pipe within an aggregated DiffServ pipe transports packets belonging to a traffic class or code point or set of traffic classes or code points being a subset of the traffic classes or code points of the aggregated DiffServ pipe. A hierarchy of traffic classes or code points is therefore formed in this manner.

In one embodiment, the method is such that determining $R_{GBR}$ includes computing $$R_{GBR} = \alpha \cdot R_{TOT} \cdot D_{GBR}/D_{TOT}$$

where $\alpha = I_{GBR}/I_{BE}$ where $I_{GBR}$ is the expected increase of the GBR traffic over a given period and $I_{BE}$ is the expected increase of the BE traffic over the given period.

The given period may be a period during which the traffic reservation is planned to be sufficient to meet the expected evolution of traffic on the communication network link. The period may for instance be one year, two years, three years or five years. This embodiment provides a practically very useful and bandwidth-efficient reservation within the network.

In one embodiment, the method further includes a step of, before reserving $R_{TOT}$ as capacity for the higher-level pipe, setting up the higher-level pipe; a step of, before reserving $R_{GBR}$ as capacity for the first lower-level pipe, setting up the first lower-level pipe; and a step of, before reserving $R_{TOT}$ as capacity for the second lower-level pipe, setting up the second lower-level pipe.

In one embodiment, the method is carried out for reserving capacity on the communication network link at one point in time, in particular one point in time in the future.

In one embodiment, the method is carried out for reserving capacity on the communication network link during a period of time. Since the purpose of dimensioning and reserving capacity is to plan the transport network capacity in a network for a relatively long period of time and to guarantee the GoS for such period of time, this embodiment is particularly useful from a practical point of view.

In one embodiment, the method is such that the grade of service (GoS) includes a maximum blocking probability.

In one embodiment, the method is such that determining $D_{GBR}$ is further based on at least one quality-of-service parameter.

The term quality-of-service (QoS) refers to the collective effect of a set of requirements or policies implemented on a network by control mechanisms to ensure that goals relating to reliability, performance, integrity or other factors are met at a packet level. The QoS may be used to determine or express the degree of satisfaction of a user of a service involving the transfer of data packets over a network.

In a sub-embodiment of this embodiment, the at least one quality-of-service parameter includes at least one of a maximum packet delay and a maximum loss requirement.

In one embodiment, the method is carried out for reserving capacity on the communication network link by reserving the capacity in a network node at one edge of the communication network link.

The invention also relates to a computer program including instructions configured, when executed on a computer, to cause the computer to carry out any one of the above-described methods.

The invention also relates to a computer-readable medium including such a computer program.

The invention also relates to a network node configured to handle at least three label switched paths (LSPs). In this context, as mentioned above, a LSP is a sequence of routers configured for routing packets each including at least one label. A label of a packet is an identifier physically contiguous to the packet and identifying a forwarding equivalence class to which the packet belongs. A forwarding equivalence class is a group of packets that are forwarded in the same manner. Furthermore, the at least three LSPs include one higher-level LSP, a first lower-level LSP for GBR traffic within the higher-level LSP, and a second lower-level LSP for BE traffic within the higher-level LSP.

The invention also relates to a network node configured to handle at least three DiffServ pipes. The at least three DiffServ pipes include one higher-level pipe being an aggregated DiffServ pipe, one first lower-level pipe being a DiffServ pipe for GBR traffic within the aggregated DiffServ pipe, and one second lower-level pipe being a DiffServ pipe for BE traffic within the aggregated DiffServ pipe.

The invention further relates to a controller configured for reserving capacity on a communication network link for at least a guaranteed bit rate (GBR) traffic and a best effort (BE)

traffic. The controller includes first to fourth determiners, and first to third reservers. The first determiner is configured for determining a dimensioned capacity, here referred to as $D_{GBR}$, for the GBR traffic based at least on an expected GBR traffic load and a grade of service (GoS). The second determiner is configured for determining a dimensioned capacity, here referred to as $D_{TOT}$, for the total traffic based at least on $D_{GBR}$, an expected BE traffic load and a GoS. The third determiner is configured for determining a reserved capacity, here referred to as $R_{TOT}$, for the total traffic by selecting, amongst capacities available on the communication network link, the minimum of these capacities that exceeds $D_{TOT}$. The fourth determiner is configured for determining a reserved capacity, here referred to as $R_{GBR}$, for the GBR traffic based at least on $D_{GBR}$, $D_{TOT}$ and $R_{TOT}$. The first reserver is configured for reserving $R_{TOT}$ as capacity for a pipe, referred to here as higher-level pipe, on the communication network link. The second reserver is configured for reserving $R_{GBR}$ as capacity for a first lower-level pipe for the GBR traffic within the higher-level pipe. Finally, the third reserver is configured for reserving $R_{TOT}$ as capacity for a second lower-level pipe for the BE traffic within the higher-level pipe.

In one embodiment, $R_{TOT}$ are calculated at more time points. Based on a cost function that includes the cost of the available link capacities, and the cost of the link configuration update, the network is configured in a cost efficient way.

BRIEF DESCRIPTION OF THE DRAWINGS

Embodiments of the present invention shall now be described, in conjunction with the appended figures, in which.

DESCRIPTION OF SOME EMBODIMENTS

The present invention shall now be described in conjunction with specific embodiments. These specific embodiments serve to provide the skilled person with a better understanding, but are not intended to in any way restrict the scope of the invention, which is defined by the appended claims.

Figure 1:
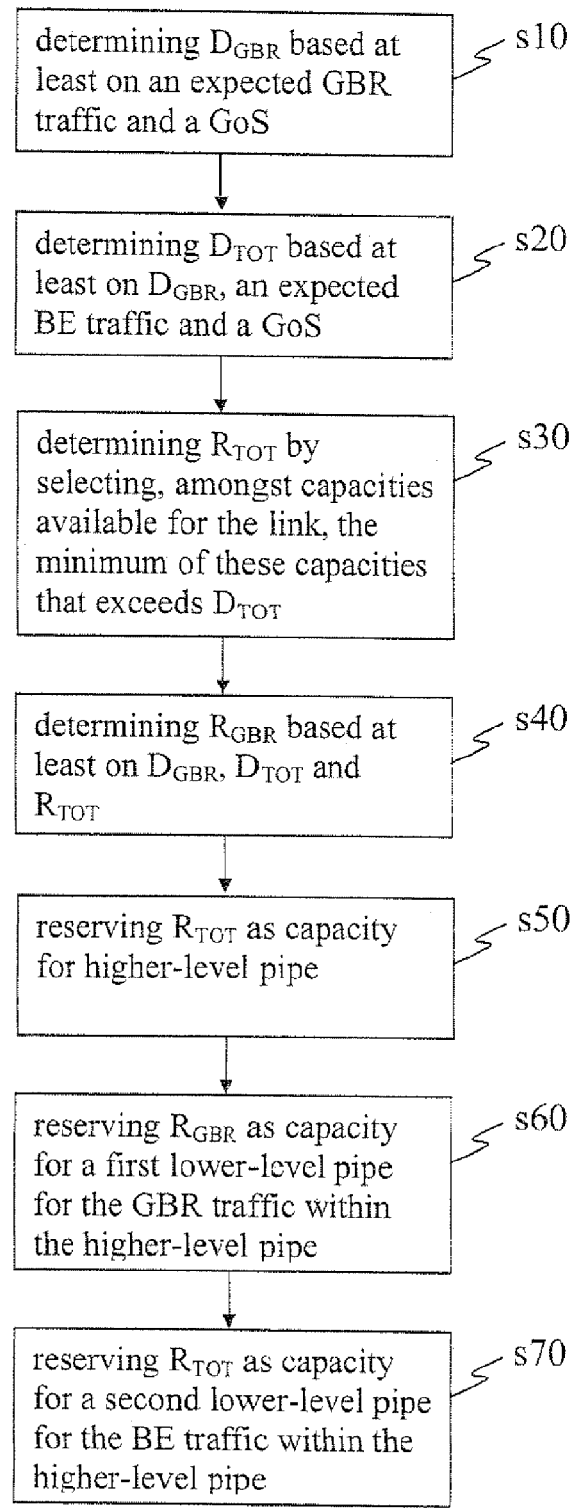
FIG. 1 is a flowchart of a method in one embodiment of the invention.

FIG. 1 is a flowchart of a method in one embodiment of the invention. The purpose and object of the method is to reserve capacity on a communication network link for at least two types of traffic, a GBR traffic and a BE traffic.

The communication network link may for instance be a link in a radio access network (RAN), such as a LTE (3GPP Long Term Evolution) RAN. In particular, the communication network link may be a LTE radio access bearer, i.e. a link between a LTE Node B and a SAE (3GPP System Architecture Evolution) gateway. The SAE gateway provides interconnection between the radio access network and an external IP network.

In LTE, the traffic is carried by radio access bearers (RABs). RABs are characterized by fix physical parameters such as transmission time interval (TTI), packet size and bit rate. Each service in the LTE RAN has well defined GoS and QoS requirements, typically maximum packet loss and packet delay, that are derived from system requirements, as well as from general user perceptions. Different services are mapped onto different RABs. The RAE, GoS and QoS parameters are the basis of traffic classification.

Delay-sensitive traffic types, such as voice data, require GBR transport. For GBR traffic, separate resources are usually reserved and they may be subject to admission control (AC). Before each RAE establishment, an admission control process is performed to determine whether the available link capacity is sufficient for ensuring the GoS and QoS for the active calls and for the new call (i.e., for the new RAB). If the capacity is not sufficient, the call is blocked.

Non delay-sensitive traffic types are usually not subject to admission control in LTE and are delivered as best effort (BE) traffic. This is notably achieved by scheduling the BE traffic into lower priority queues in the switches and routers.

In step 910, the dimensioned capacity $D_{GBR}$ is determined based at least on an expected GBR traffic load and a GoS. The determination is made using a probabilistic traffic model, based on hypotheses and/or measurements. The expected GBR traffic load is also based on hypotheses and/or measurements. The GoS is specified per service for the GBR traffic. The Kaufman-Roberts formula may for instance be used. The invention is however not limited to this dimensioning formula or algorithm.

In step s20, the dimensioned capacity $D_{TOT}$ is determined based at least on $D_{GBR}$, an expected BE traffic load and a GoS. The determination is also made using a probabilistic traffic model, based on hypotheses and/or measurements that may be specific to the BE traffic. The expected BE traffic load is also an input based en hypotheses and/or measurements. The GoS is also specified per service for the BE traffic. The Kaufman-Roberts formula may be used. The invention is however not limited to this dimensioning formula or algorithm.

Steps s10 and s20 may further take into account other network communication links and may therefore be carried out in the context of a computation applied to a plurality of links in the network. Such computation will not be herewith described in details.

In step s30, a capacity $R_{TOT}$ is selected for the total traffic. Usually, a limited number of discrete capacities for a link (for instance a leased line) are available, such as for instance E1 links (i.e., E-carrier level 1 type with line data rate of 2.048 Mbit/s), E2 links (i.e., E-carrier level 2 type with bit rate of 8.448 Mbit/s), STM1 links (Synchronous Transport Module Level 1 type with bit rate of 155.52 Mbit/s on optical fibers) or 2" bytes lines. Due to the availability of only a number of discrete capacities for the communication link, the reserved capacity $R_{TOT}$ for the whole traffic exceeds the dimensioned capacity $D_{TOT}$. The minimum available capacity which exceeds the dimensioned capacity $D_{TOT}$ is selected for $R_{TOT}$ in order to minimize any over-dimensioning.

In step s40, the reserved capacity $R_{GBR}$ for the GBR traffic is computed. The computation may for instance be $$R_{GBR} = R_{TOT} D_{GBR} / D_{TOT}.$$

In other words, the reserved capacity $R_{GBR}$ for the GBR traffic is equal to the dimensioned capacity $D_{GBR}$ for the GBR traffic, but corrected in accordance with the extent to which the reserved capacity $R_{TOT}$ for the total traffic is larger than the dimensioned capacity $D_{TOT}$ for the total traffic. The extent to which the reserved capacity $R_{TOT}$ is larger than the dimensioned capacity $D_{TOT}$ may be represented (and, in the above formula, is represented) by the ratio $R_{TOT}/D_{TOT}$. In such a manner, the reserved capacity $R_{TOT}$ in excess of the dimensioned capacity $D_{TOT}$ is shared out among the BE and GBR traffic in a fair manner.

If the capacity reservation is made for a period of time (the period of interest) during which the loads for the different types of traffic are expected to change, or for a point in time in the future at which the loads for the different traffic types are expected to be different from the initial loads, the computation of the reserved capacity $R_{GBR}$ in step s40 may include a correction factor $\alpha$ (i.e. alpha) taking into account the difference of expected increase of the BE and GBR traffic. The computation may for instance be $$R_{GBR} = \alpha \cdot R_{TOT} D_{GBR} / D_{TOT},$$

where the correction factor $\alpha = I_{GBR}/I_{BE}$, with $I_{GBR}$ being the expected increase of the GBR traffic over the period of interest and $I_{BE}$ being the expected increase of the BE traffic over the period of interest.

In steps s50, s60, and s70, the capacities are reserved in the network. This may be performed for instance using the RSVP-TE protocol or another network management system or protocol. In particular, $R_{TOT}$ is reserved s50 as capacity for a higher-level pipe on the communication network link. $R_{GBR}$ is reserved s60 as capacity for a first lower-level pipe for the GBR traffic within the higher-level pipe. $R_{TOT}$ is reserved s70 as capacity for a second lower-level pipe for the BE traffic within the higher-level pipe.

Steps s10 to s70 may be performed for one point in time or may be performed for a planning period. Carrying out the method for a planning period may include performing the method for a time point at the beginning of the period, for a time point at the end of the period, and for a number of intermediary points within the planning period. Taking a number of intermediary points within the planning period into account enables sudden Changes in the dimensioned capacities, for instance due to the expected launch of new services, to be integrated within the reservation and dimensioning method.

Figure 2:
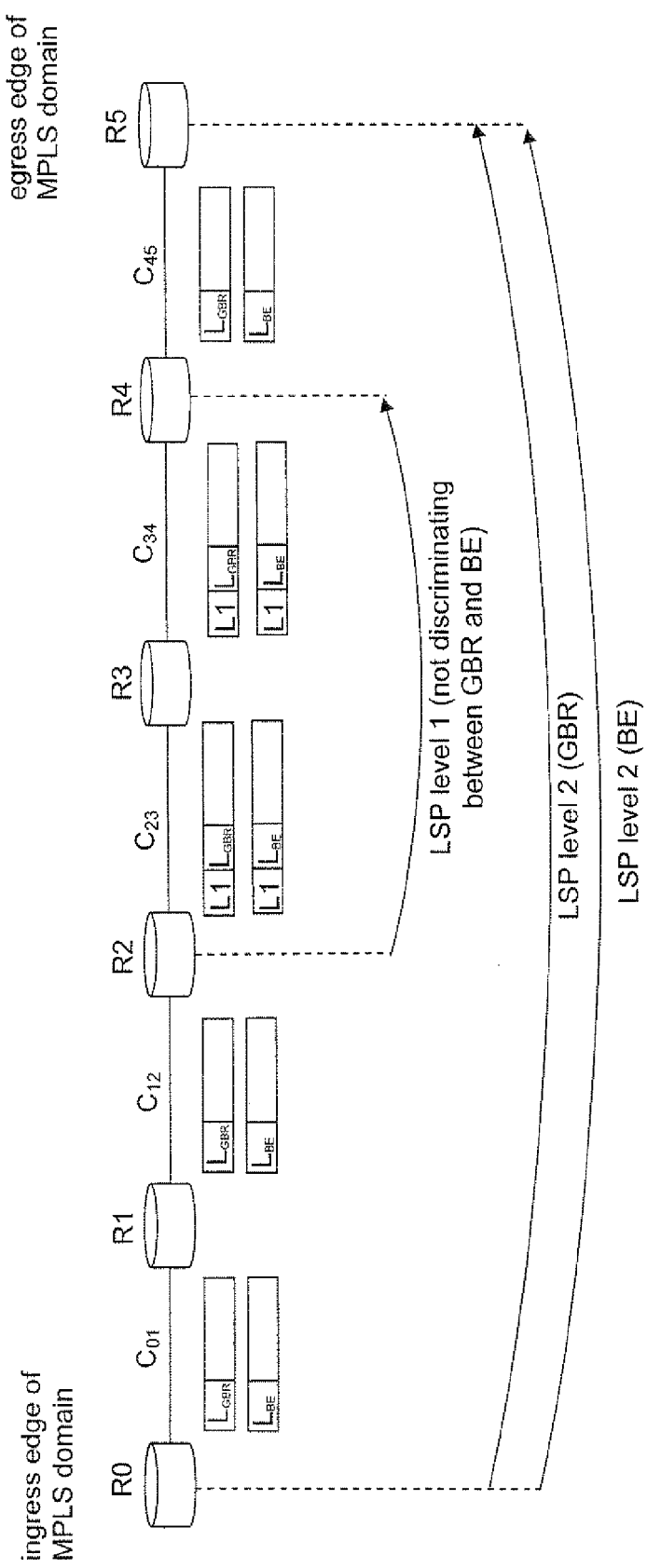
FIG. 2 schematically illustrates a sequence of routers and label switch Paths that may be used in the context of one embodiment of the invention.

FIG. 2 schematically illustrates an exemplary sequence of routers in the context of which a method according to one embodiment of the invention wherein LSPs are involved may be carried out.

The routers R0, R1, R2, R3, R4, R5 are connected by network communication links $C_{01}$, $C_{22}$, $C_{23}$, $C_{34}$, $C_{45}$. Router R0 forms the ingress edge of an MPLS domain and router R5 forms the egress edge of the MPLS domain. Between router R0 and router R5, the routing is performed using the MPLS labels in the packet headers. The route and traffic control policies associated with label $L_{GBR}$ form the first lower-level LSP "LSP level 2 (GBR)". The route and policies associated with label $L_{BE}$ form the second lower-level LSP "LSP level 2 (BE)".

Between routers R2 and R4, the two lower-level LSPs are nested within a higher-level LSP "LSP level 1 (not discriminating between GBR and BE)". The higher-level LSP is associated with a header label. L1 and is applicable for routing all the traffic, whatever its type. Routers R2 and R4 are the label edge routers (LER) for the higher-level LSP.

Figure 6:
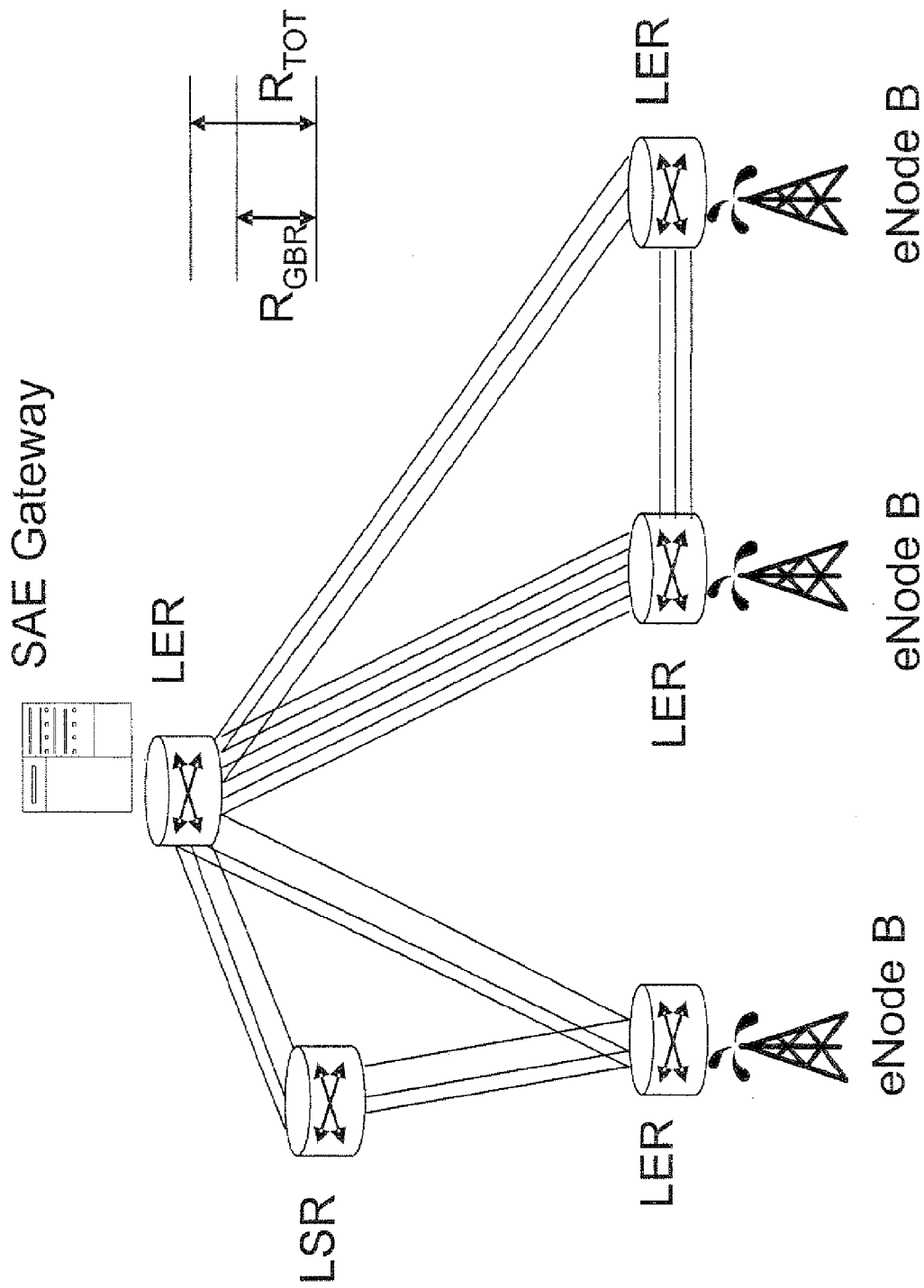
FIG. 6 schematically illustrates a LTE radio access network (RAN) to which the method in one embodiment of the invention may be applied.

The dimensioning and reservation method of the present embodiment, and more generally of the invention, may be targeted at configuring traffic control policies and mechanisms in routers such as routers R2 and R4. For instance, router R2 may correspond to a LER of a SAE gateway and router R4 may correspond to a LER of an eNode B, as illustrated in FIG. 6.

Figure 3:
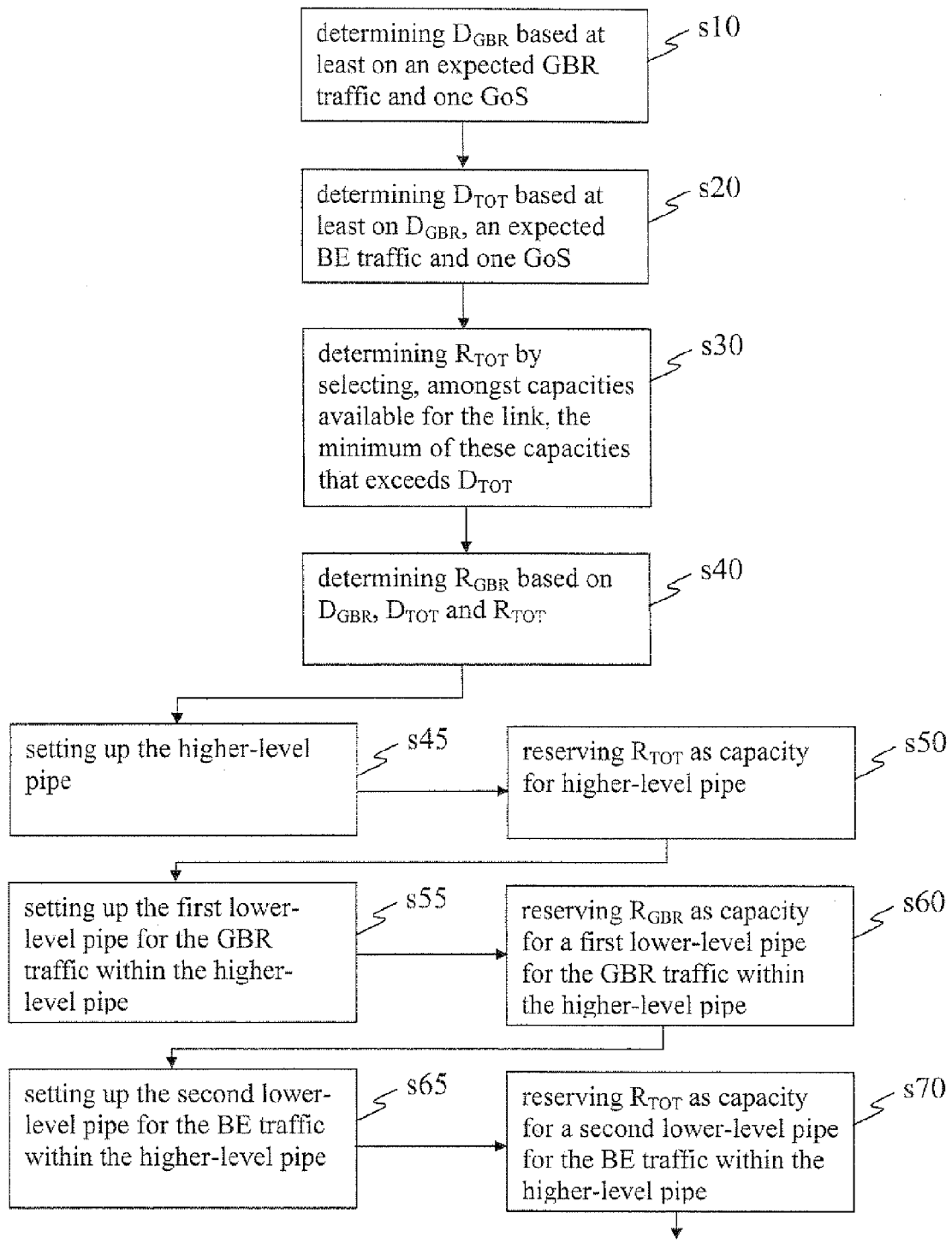
FIG. 3 is a flowchart of a method in another embodiment of the invention.

FIG. 3 is a flowchart of a method according to one embodiment of the invention, which differs from the method illustrated in FIG. 1 in that steps of setting up s45, s55, s65 the pipes in the network are included, respectively before steps s50, s60 and s70 of reserving the capacities for the transport pipes.

Figures 4, 5:
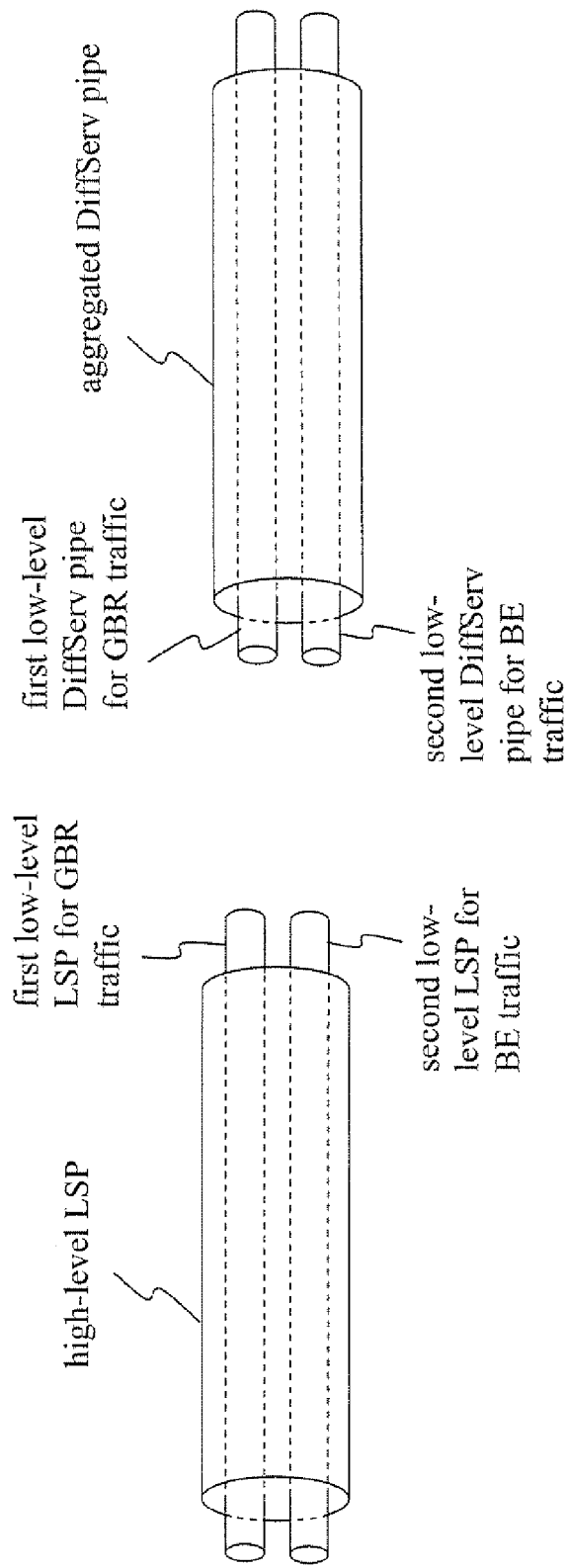
FIGS. 4 and 5 schematically illustrate two network communication links, each one with a higher-level pipe and two lower-level pipes, in one embodiment of the invention.

FIG. 4 schematically illustrates a network communication link including a high-level LSP (acting as higher-level pipe), and two lower-level LSPs, namely a first low-level LSP (acting as first lower-level pipe) for the GBR traffic and a second low-level LSP (acting as second lower-level pipe) for the BE traffic.

FIG. 5 schematically illustrates a network communication link including an aggregated DiffServ pipe (acting as higher-level pipe), and two lower-level DiffServ pipes, namely a first low-level DiffServ pipe (acting as first lower-level pipe) for the GBR traffic and a second low-level DiffServ pipe (acting as second lower-level pipe) for the BE traffic.

The illustrations of the network nodes of FIGS. 4 and 5 are schematic and made at a logical transport level.

FIG. 6, already briefly mentioned above, schematically illustrates where nested LSPs may be configured in a LTE RAN, in one embodiment of the invention. It is also apparent that alternative LSPs may be established for redundancy and mobility purposes.

GBR traffic packets are marked in order to have priority over the BE traffic in the LSRs. The resources are reserved for the total traffic including all services (GBR+BE). Within this capacity, transport resources are reserved for GBR type traffic, while for BE traffic no resources are reserved in a guaranteed manner. BE traffic is allowed to use the capacity reserved for the total traffic. Admission control is usually applied for GBR traffic types. Admission control is optional however.

A method according to one embodiment of the invention will now be explained, taking into account, in addition and if necessary, the costs associated with the use and maintenance of the communication network links. In particular, how to reserve the capacity using LSPs will now be described in a hypothetical transport scenario and with hypothetical costs.

Figure 7:
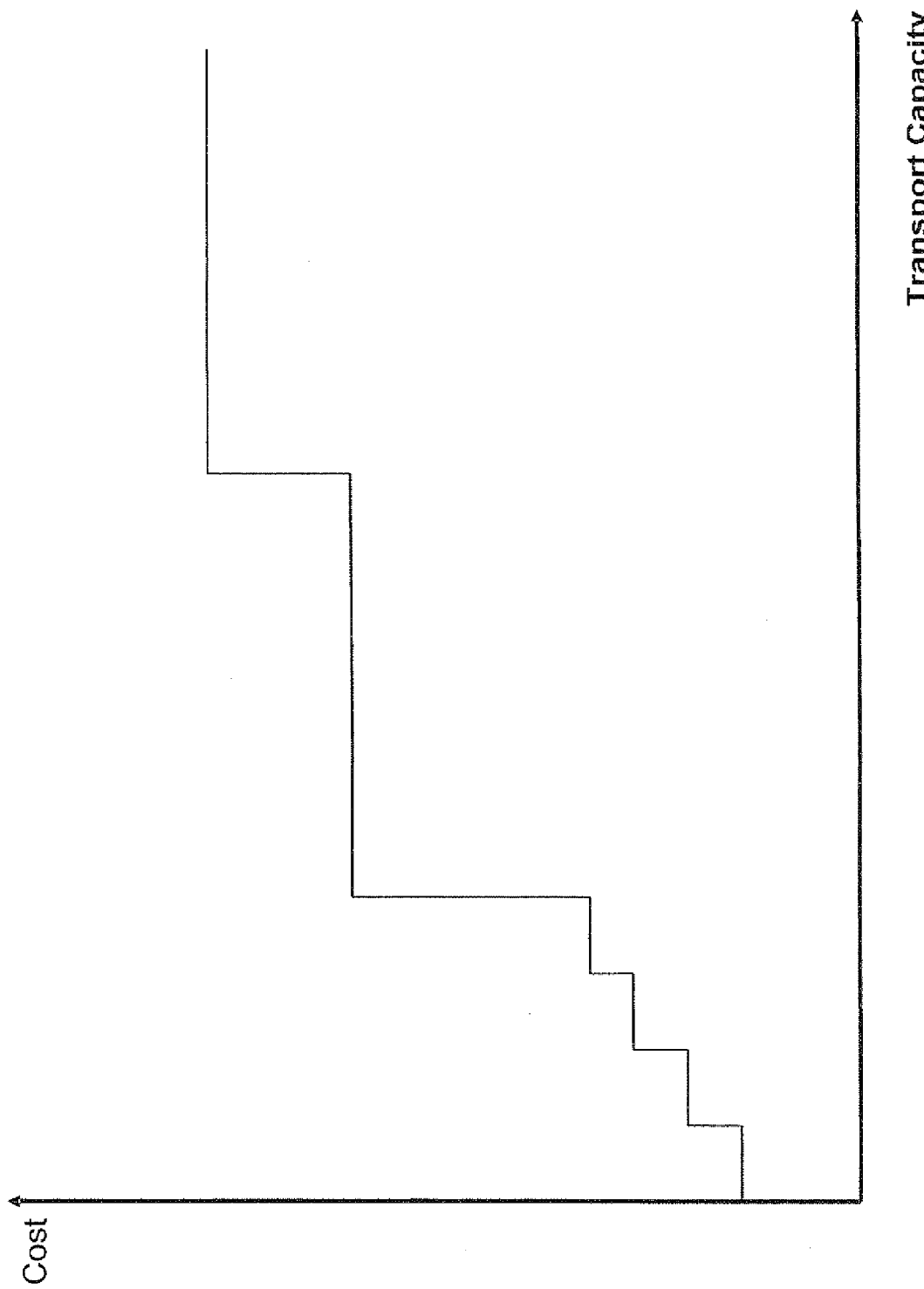
FIG. 7 illustrates an exemplary cost function of a transport capacity for a network communication link to which a method according to one embodiment of the invention may be applied.

First, the cost function of the transport capacity is determined for each physical link. The transport links can be for instance leased lines, microwave links, optical links or Ethernet links. The transport capacity is usually available in discrete units, such as number of E1s, STM1, $2^n$ Mbytes, 100 Mbit, 1 Gbit links, etc. Therefore, the cost is usually not a continuous function of the capacity. There are usually steps in the cost function at points where new equipment is required, or simply just due to the price policy of the provider. The cost should include the capital expenditure (CAPEX) and operational expenditure (OPEX) for the planning period, for example 2, 3 or 5 years. An exemplary cost function of the transport capacity for a link is illustrated in FIG. 7.

It is assumed that the transport network can be upgraded maximum once during the planning period, in order to adapt the capacity to the traffic load. If a longer period is needed, this longer period is divided into an appropriate number of planning periods and the method below is applied separately for each planning period.

The next step is to determine the traffic model at each link. The traffic model includes the average load, e.g. in Erlang or in kbps units, of each service in a peak time period, e.g. peak hour. The traffic data is available usually at and nodes.

In an aggregated link, the aggregated traffic is considered. The expected traffic data may be based on traffic measurements and/or marketing analysis. The expected traffic data is determined for the planning period.

A simple model is constructed for example if the traffic load is measured for each service at the beginning of the planning period. This measurement may be done in the network of interest if the network is already in operation, using an external tool or using an OSS that controls each network element. Alternatively, the measurement may be performed in a different network instead while extending the data with new services, or in a similar network with similar subscriber conditions. Using marketing data and business analysis, a forecast may be made for each service in the planning period. A simple model may be for instance that voice traffic is expected to increase 10% each year, and that High Speed (HS) traffic is expected to increase 20% each year. In year 2, a new service e.g. MBMS is introduced, etc. The expected traffic in the future may be obtained by extrapolating historical traffic data as well. The expected load is an input of the method.

The traffic is classified in traffic classes, such as GBR1, GBR2, ..., BE1, BE2 etc. The GBR type traffics GBR1, GBR2, ... are aggregated and one common resource is set for all GBR traffic. Likewise, the BE type traffics BE1, BE2, ... are aggregated and handled together. In the example above the voice traffic is mapped into a GBR traffic class while HS is handled as BE traffic type.

The yearly increase of GBR traffic is calculated as the average of the yearly increase of the GBR service types weighted with the relative volume of the different traffic types. Likewise, the yearly increase of BE traffic is calculated as the average of the yearly increase of the BE service types weighted with the relative volume of the traffic types.

Figure 8:
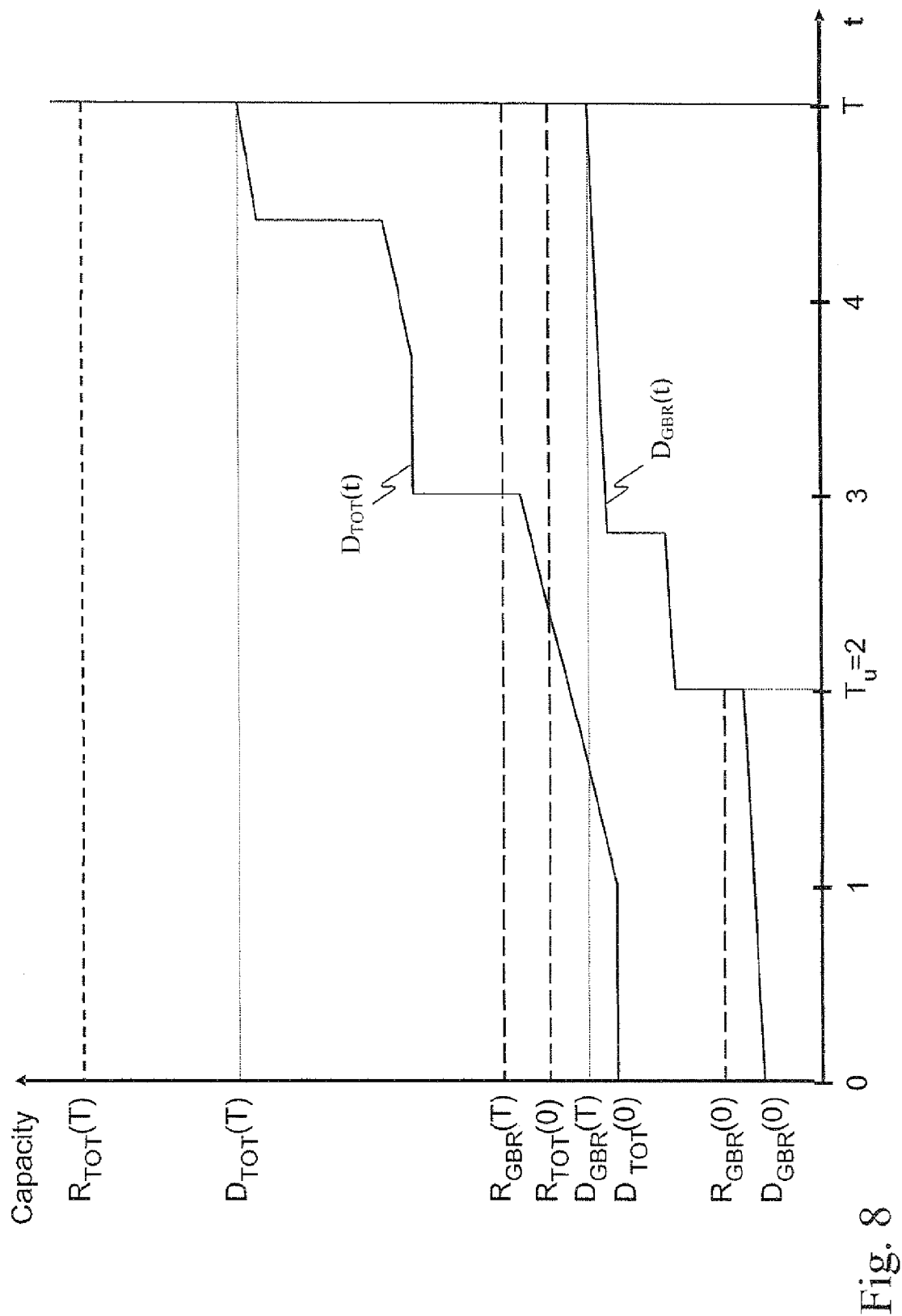
FIG. 8 illustrates exemplary capacities as a function of time in the context of which a method according to one embodiment of the invention may be applied.

The next step is to determine the dimensioned capacity at a number of points in the planning period for each link. This may be achieved for instance using the method described in PCT application WO2007/032733 ("Improved dimensioning methods for HSDPA traffic"). The number of calculating points depends on the processing time of the dimensioning calculation. If it is very time consuming, the number of calculating points should be minimized. More calculation points are preferably used around the points where the dimensioned capacity changes suddenly as a function of the load, as shown in FIG. 8. The dimensioning method takes into account the GoS and QoS requirements, set for each service.

In FIG. 8, an exemplary dimensioned capacity as a function of time, where the BE traffic is allowed to use the capacity reserved for the GBR traffic, is illustrated.

Let us assume that, according to business analysis as an input, the GBR traffic is expected to increase at a rate of 10% per year, while the BE traffic is expected to increase at a rate of 20% per year compared to the baseline traffic (the reference traffic at time t=0).

As apparent from FIG. 8, the dimensioned capacity $D_{GBR}$ for the GBR traffic increases linearly as a function of the time during years 1 and 2 (i.e. from t=0 to t=2).

At the end of year 2 (i.e. at time t=2), a new service requiring a guaranteed bit rate is added to the network. This new service requires a certain minimum reserved capacity. Therefore, the dimensioned capacity $D_{GBR}$ for GBR traffic suddenly increases.

At one point during year 3 (i.e. at one point between t=2 to t=3), a system limit is reached, so that the dimensioned capacity $D_{GBR}$ for GBR traffic suddenly increases again. This system limit may for instance correspond to when a Channel Identification (CID) limit is reached. The number of the actually used CIDs depends on the number of active connections.

In this example, up to the end of year 1 (i.e. until time=1), the dimensioned capacity $D_{TOT}$ for the total traffic is limited by the minimum peak or average bandwidth offered for a single user in a system. Therefore, the dimensioned capacity $D_{TOT}$ does not increase as the traffic load increases. Afterwards, the dimensioned capacity $D_{TOT}$ for the total traffic is limited by the traffic load. Therefore, it increases as the traffic increases.

At the end of year 3 (i.e. at time t=3), the offered target values are increased by 50%. Therefore, the required bandwidth also increases suddenly and limits the dimensioned capacity $D_{TOT}$ for the total traffic.

Another system limit may for instance be the number of used radio HS channel codes. When the number of used radio HS channel codes is increased, the required bandwidth for BE traffic is increased suddenly, as illustrated for instance between time t=4 and time t=5.

Let us now explain how the reserved capacities and the associated LSP bandwidth limits are determined, in this embodiment, and still with reference to FIG. 8. In other words, the required transport capacity for GBR (the reserved capacity $R_{GBR}$) and the required transport capacity for total traffic (the reserved capacity $R_{TOT}$) for the planning period are computed and the LSP bandwidth limits (to be set in the routers) are configured in order to, at the same time, (1) minimize the transport cost, including the cost of needed reconfiguration,
(2) minimize the probability of reconfiguration, and
(3) maximize the QoS and GoS for the planning period.
This description refers to one eNode B.

First, the dimensioned traffic is determined for the total traffic and for the GBR traffic at time t=0 and time t=T, where T is the duration of the planning period, using a dimensioning algorithm (for instance the one described in PCT application WO 2007/032733, as mentioned above). They are referred to respectively as $D_{TOT}(0)$, $D_{GBR}(0)$ and $D_{TOT}(T)$, $D_{GBR}(T)$.

$R_{TOT}(0)$ is set as the minimum of the available transport capacities $R_n$ that exceeds $D_{TOT}(0)$, as illustrated in FIG. 8. Likewise, $R_{TOT}(T)$ is the minimum of the available transport capacities $R_n$ that exceeds $D_{TOT}(T)$.

The reserved capacity for GBR traffic at time t is defined as $R_{GBR}(t)=\alpha \cdot R_{TOT}(t) \cdot D_{GBR}(t)/D_{TOT}(t)$, where $\alpha=I_{GBR}/I_{BE}$ is a correction factor taking into account difference of the yearly increases of the GBR and that of the BE traffic. In the above example, $I_{GBR}=10\%$ and $I_{BE}=20\%$, so that $\alpha=0.5$.

The time of the transport network update, $T_u$, is determined using the following equation: $R_{GBR}(0)=D_{GBR}(T_u)$, as illustrated in FIG. 8.

Let us note $C(R_{TOT}(T))$ as the cost of transport capacity $R_{TOT}(T)$, and $C(R_{TOT}(0))$ as the cost of transport capacity $R_{TOT}(0)$. $C_u$ is the cost of an update of transport capacity and reconfiguration of the link during the planning period. It may be the same parameter for each link or may be determined for each link separately.

1. If $[C(R_{TOT}(T))-C(R_{TOT}(0))]*T_u > T*C_u$, the total bandwidth should be configured at time t=0 for $R_{TOT}=R_{TOT}(0)$. The transport capacity that should be reserved for the GBR traffic is $R_{GBR}=R_{GBR}(0)$. The transport capacity should be updated at time $t=T_u$.

2. If $[C(R_{TOT}(T))-C(R_{TOT}(0))]*T_u < T*C_u$, the bandwidth should be configured so that $R_{TOT}=R_{TOT}(T)$ and $R_{GBR}=R_{GBR}(T)$ starting from time t=0. Thus, the transport network need not be reconfigured during the planning period of duration T.

If, for all links, the second condition "2." is valid, the transport network need not be updated. For the links for which the transport capacity needs to be updated, the actual utilization and other key performance indicators (KPIs) of the transport capacity may be monitored. The KPIs indicate whether an update is necessary. Otherwise, the transport capacity is updated at $t=T_u$.

Let us now provide a particular basic numeric example of how costs may be taken into account when an update is expected in the planning period, Let us take an estimated network traffic for a planning period [0; T] for physical link $C_n$ (illustrated in FIG. 2) as follows:

$$D_{TOT}(0)=12 \text{ Mb/s}$$

$$D_{TOT}(T)=20 \text{ Mb/s}$$

$$D_{GBR}(0)=4 \text{ Mb/s}$$

$$D_{GBR}(T)=6 \text{ Mb/s}$$

Let us assume that a linear increase is expected for both the total traffic and the GBR traffic during the planning period [0; T].

Let us further assume that the available transport capacities are 4 Mb/s, 8 Mb/s, 16 Mb/s, 32 Mb/s and 64 Mb/s, and that the associated maintenance costs are $ 100 per unit of time for the 16 Mb/s line and $ 150 per unit of time for the 32 Mb/s line.

Let us further assume that the cost of updating a 16 Mb/s line to a 32 Mb/s line is $ 125. Let us further assume that T=4.

According to the first option (Option 1), if the physical link $C_{23}$ is initially dimensioned with a 16 Mb/s line, it will need to be updated at T=2 to a 32 Mb/s line because $D_{TOT}(2)$ is expected to be equal to 16 Mb/s (the network traffic evolution for physical link $C_{23}$ is expected to be linear between $D_{TOT}(0)=12$ Mb/s and $D_{TOT}(4)=20$ Mb/s). The total cost of this option will therefore be (2*100)+125+(2*150)=$625.

According to the second option (Option 2), if the physical link $C_{23}$ is initially dimensioned with a 32 Mb/s line, there will be no need for update during the planning period [0; T]. The total cost of this option will therefore be (4*150)=$ 600. Option 2 is therefore better.

In one embodiment of the invention, the method is implemented in a software tool. The software tool may have the following capabilities:
(i) To divide the time period of interest into planning periods, if necessary.
(ii) Based on the initial traffic model (i.e., the expected traffic during the planning period), expected yearly traffic increase and planned new services, to determine the dimensioned capacities $D_{TOT}$ and $D_{GBR}$ for the total and GBR traffic at the necessary points for each end node.
(iii) To determine the required capacity $R_{TOT}$ for the total traffic and the capacity $R_{GBR}$ that should be reserved for GBR traffic for each end node at the initial stage.
(iv) To determine whether these capacities should be updated within the planning period, or not. The software tool should also be able to determine the time when the capacity has to be updated, for each end node.
(v) To determine the capacity to which the total transport capacity and the reserved capacity for GBR traffic should be updated for each affected link.
(vi) To make a report of the above values for each link and to indicate the links that should be updated in the order of update times.

The software tool makes it easier to determine the optimum transport capacity and configuration separately for a large number of links. It is especially useful if the configuration is based on an automatic process that is suitable for handling bulk data. In this case, the total cost of the transport is simply the sum of the costs of the transport links.

If the configuration is a manual process, it is reasonable to select one common configuration for groups of links in order to minimize the configuration work and possible errors. In this case, the software tool is useful to determine the cost-optimized common configuration and required capacity for a large number of links. In this case, the least common capacities and configuration values are selected for the groups and the corresponding transport cost is multiplied by the number of links in the group.

In other words, the software tool makes it easier to determine a common optimum configuration and required capacity for a large number of links, to reduce the configuration burden on the operator.

The software tool may also be used to identify the links in relation to which monitoring is required or in relation to which monitoring extra KPIs is needed during operation.

The software tool further makes it easier to plan the transport network update and the cost of transport network update in advance, before QoS or GoS degradation occurs.

Let us now explain an implementation of the method in an operations support system (OSS) in one embodiment of the invention, with reference to FIGS. 9 to 13.

Figure 9:
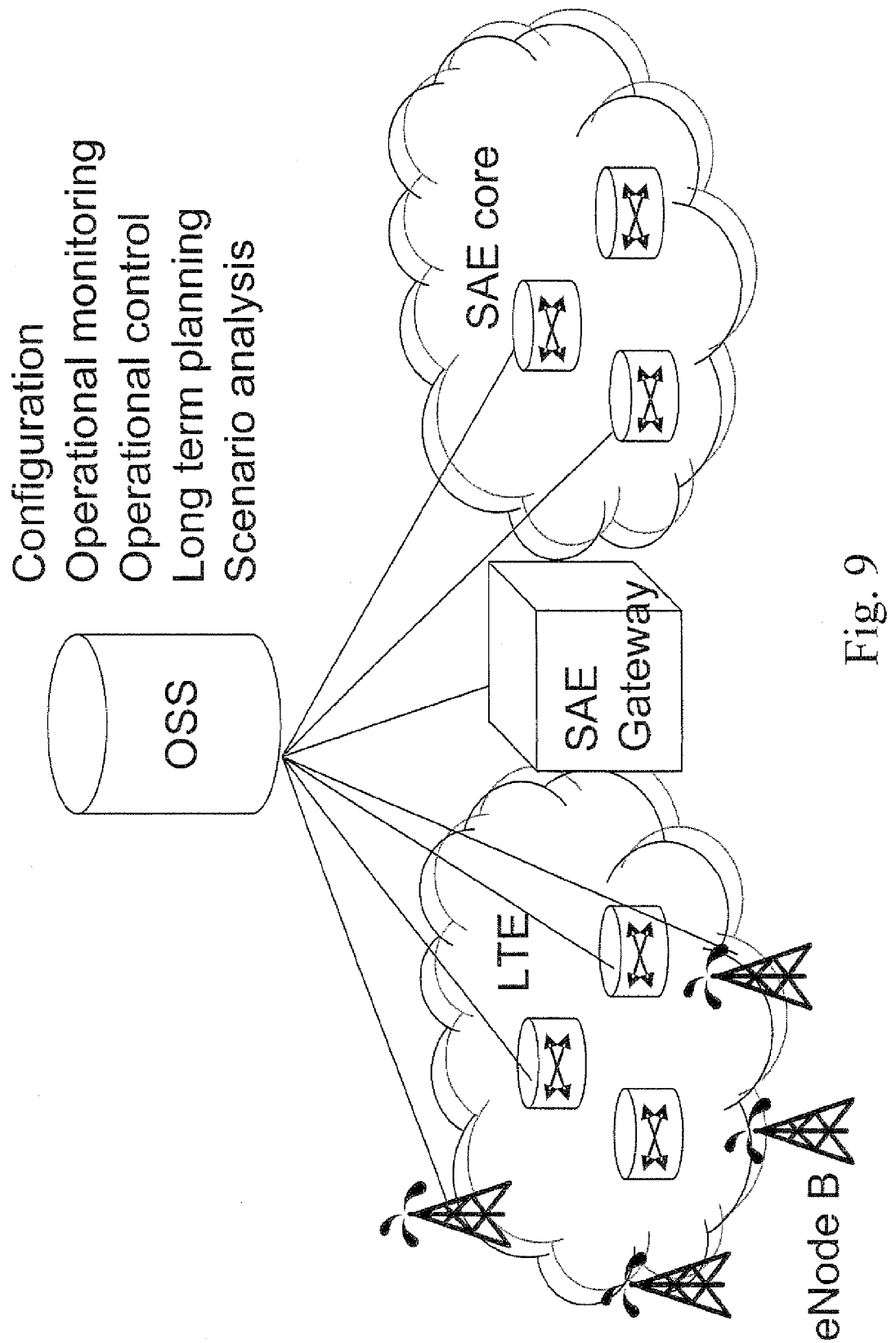
FIG. 9 schematically illustrates an operations support system (OSS) which may be used in an LTE environment in one embodiment of the invention.

The OSS controls the network nodes including the transport network nodes, routers, switches LSR, LER, as illustrated in FIG. 9, which shows an exemplary implementation with an OSS.

Figure 10:
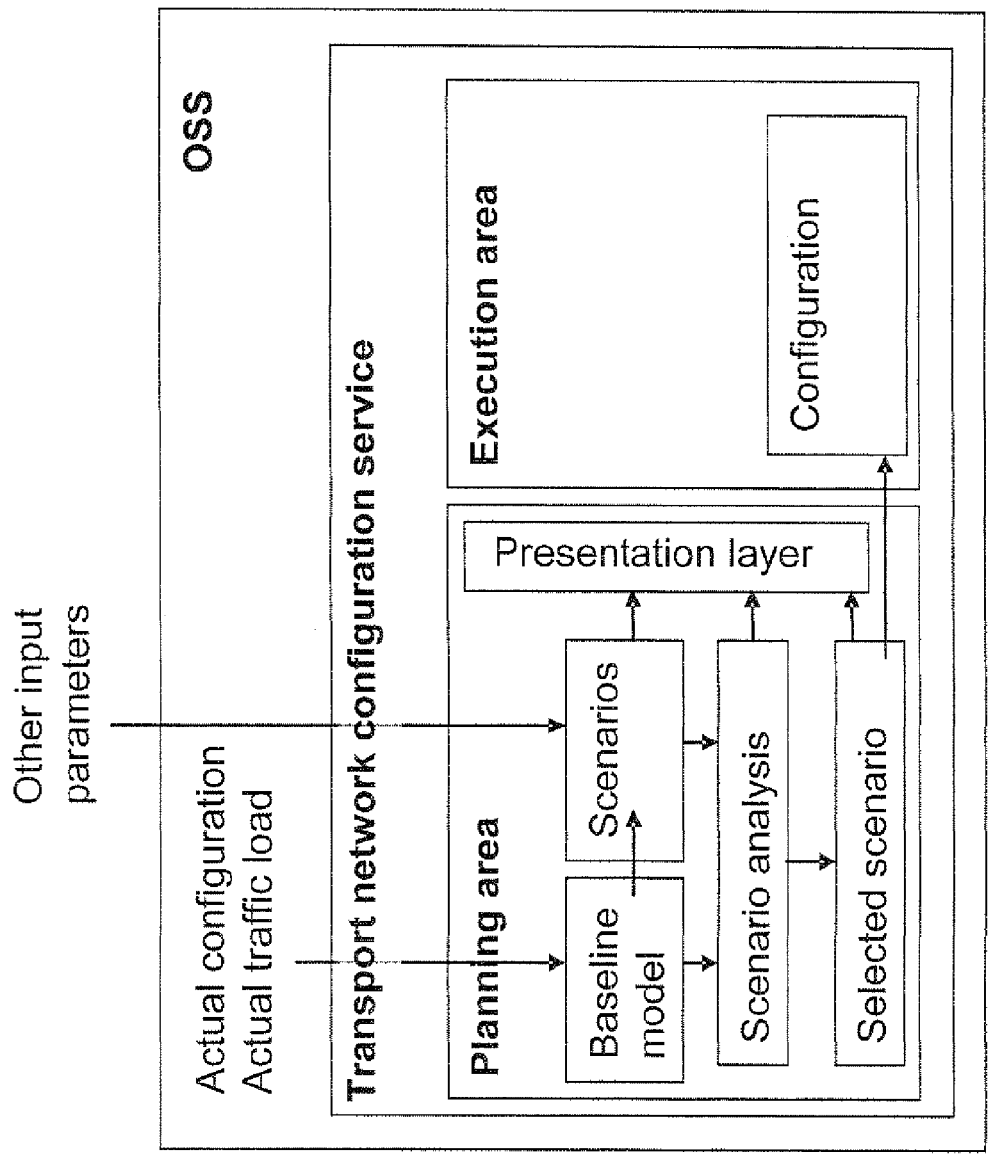
FIG. 10 schematically illustrates a workflow and some functions of an OSS implementing a method in one embodiment of the invention.

The method is implemented in the "Planning area" (for instance implemented using a set of computer program instructions) of the "Transport network configuration service" of the OSS, as shown in FIG. 10. FIG. 10 illustrates the workflow and some functions of the OSS.

Implementing the method in an OSS may be used for carrying out a transport network scenario analysis. The actual traffic and configuration parameters are obtained from the network through the OSS. The different traffic, capacity and cost scenarios are created by modifying the input parameters of the model, notably including:
the yearly increase of the expected traffic (based on marketing forecast, and/or extrapolated from historical, measured data);
the time and nature of introduced new services;
available link capacities;
the cost of the capacities; and
length of the planning period.

In the planning area (illustrated in FIG. 10), the different scenarios are analyzed and compared. The selected scenario can be transferred to the execution area (also for instance implemented using a set of computer program instructions) in order to then be configured into the network (e.g. using the RSVP-TE protocol).

Figure 11:
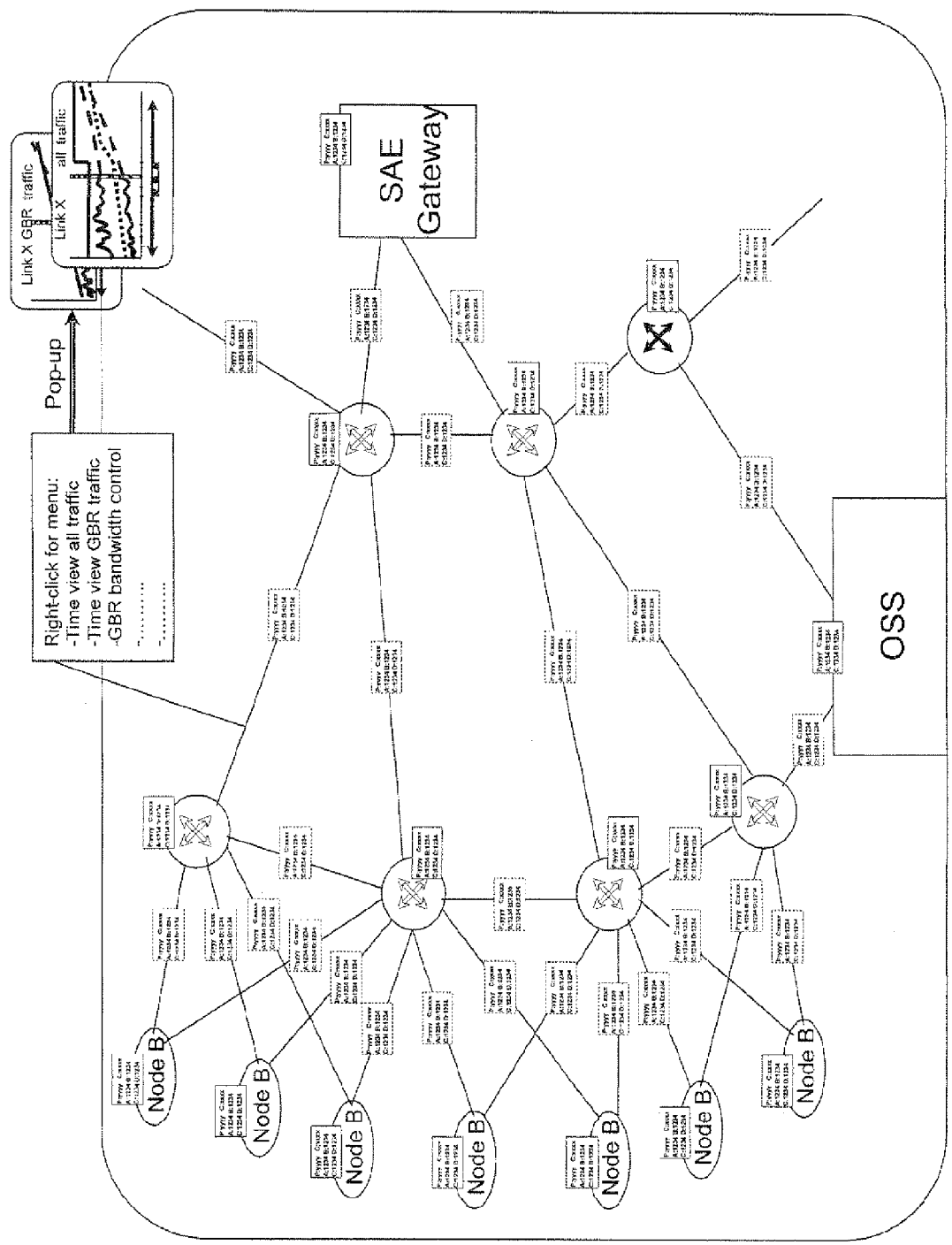
FIG. 11 schematically illustrates an overview of presentation of the methods that may be obtained using an OSS for planning in one embodiment of the invention.

FIG. 11 provides an overview of a possible presentation of exemplary results, in one embodiment of the invention. In other words, FIG. 11 schematically illustrates a user interface of an OSS in one embodiment of the invention.

The planning area of the transport network configuration service includes a presentation layer, through which the results are displayed in different views. The presentation function displays an overview of the whole transport network, or a selected part of the transport network. By selecting a link, the detailed results are displayed, as shown in FIG. 11.

Figure 12:
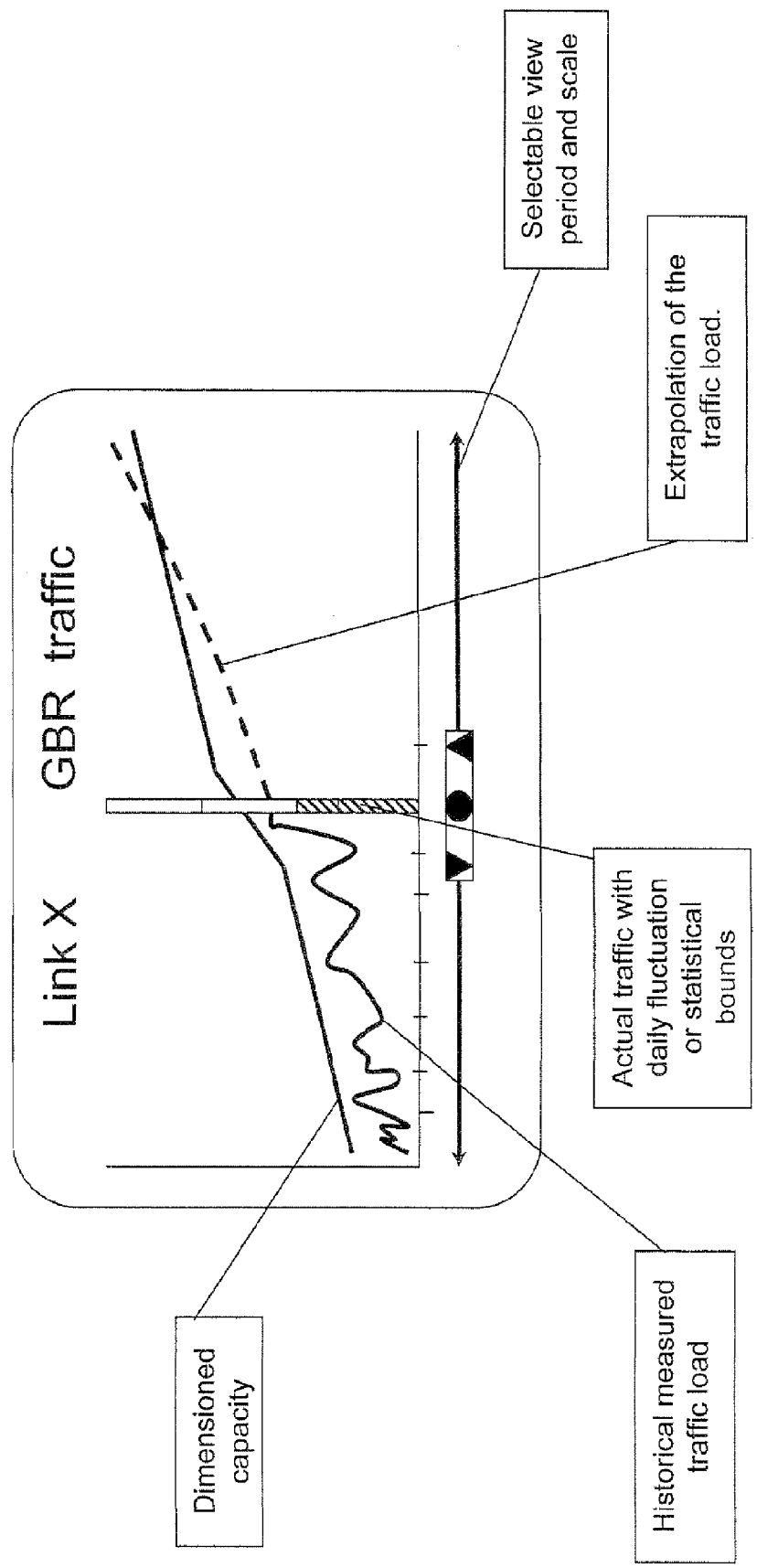
FIG. 12 is an example of display of the traffic loads and dimensioned capacity for GBR traffic type which may be displayed using an OSS in one embodiment of the invention.

FIG. 12 illustrates an example of display of the traffic load and dimensioned capacity for the GBR traffic type per link or cumulative for a group or all links for CN traffic dimensioning in LTE. It is possible to display traffic and dimensioned capacities for selected traffic types, as shown in FIG. 12. The display shows traffic loads, dimensioned capacities as a function of the time. In the charts, measured historical data, actual data and expected data based on extrapolation can be simultaneously monitored by an operator. A cursor bar may display daily fluctuations of the data as well as, in another time scale, statistical fluctuation of the data.

Figure 13:
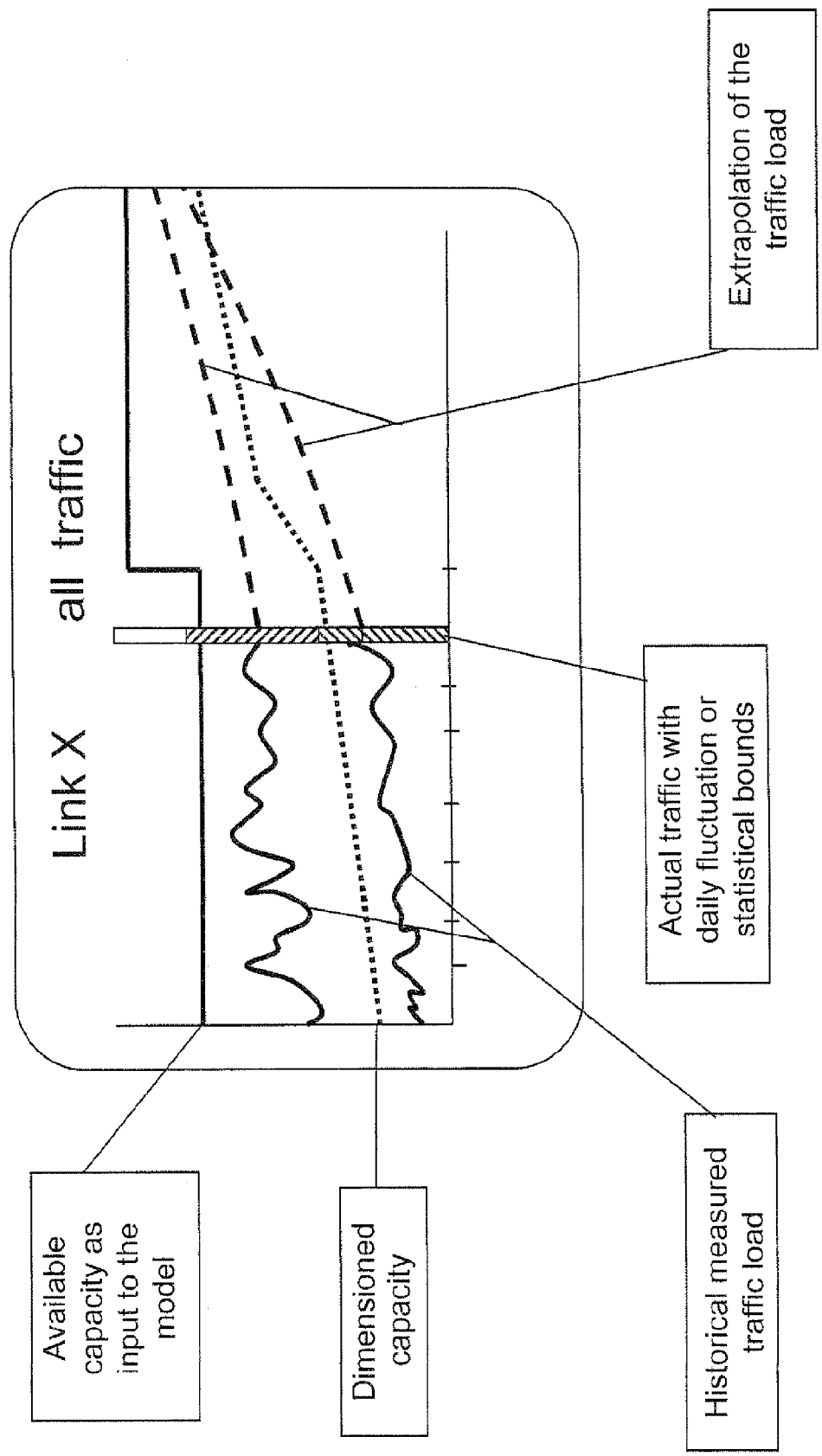
FIG. 13 is an example of display of traffic far a node or all links in the context of LTE, using the OSS in one embodiment of the invention.

FIG. 13 illustrates an example display of combined traffic per link or cumulative for a node or all links for CN traffic dimensioning in LTE. In other words, FIG. 13 illustrates an example of displaying the results: available capacity, dimensioned capacity and traffic load, as a function of the time.

Likewise, the different traffic types can be the displayed with the available capacities in the same chart, as illustrated on FIG. 13.

The analysis and presentation layer may be used to check whether GoS and QoS are met in a given link and to predict the time when a capacity update is needed. By comparing the dimensioned capacity with the available capacity, it is also possible to see the expected level of QoS and GoS degradation in the event of insufficient transport capacities. It also presents the cost of different future configuration scenarios, which can also be directly compared.

Using these functions, the operator has the possibility to evaluate
  existing configuration with actual traffic;
  existing configuration with future traffic load (extrapolated, estimated or hypothetical);
  a new configuration scenario with actual traffic; and
  a new configuration scenario with future traffic load from the point of view of cost, QoS and GoS.

The selected configuration scenarios may be moved to the execution area, where functions of OSS are used to configure the new parameters into the network nodes.

Therefore, by using the method of this embodiment of the invention in an OSS, the operator has the possibility to:
  Obtain the baseline traffic model and configuration from the network;
  Compare different future scenarios in the planning area and make decisions on the investment based on the required capacity;
  Have a time view of the link capacities and needed investments, based on the selected scenarios and traffic model;
  Compare actual measured load with predicted one and configured capacities;
  Verify transport network for an exceptional event;
  Identify links where investment is needed, or will be needed in the future;
  Obtain a comparison of QoS, GoS vs. transport capacities and a corresponding analysis;
  Configure the selected scenario by moving the selected configuration to the execution area automatically.

Figure 14:
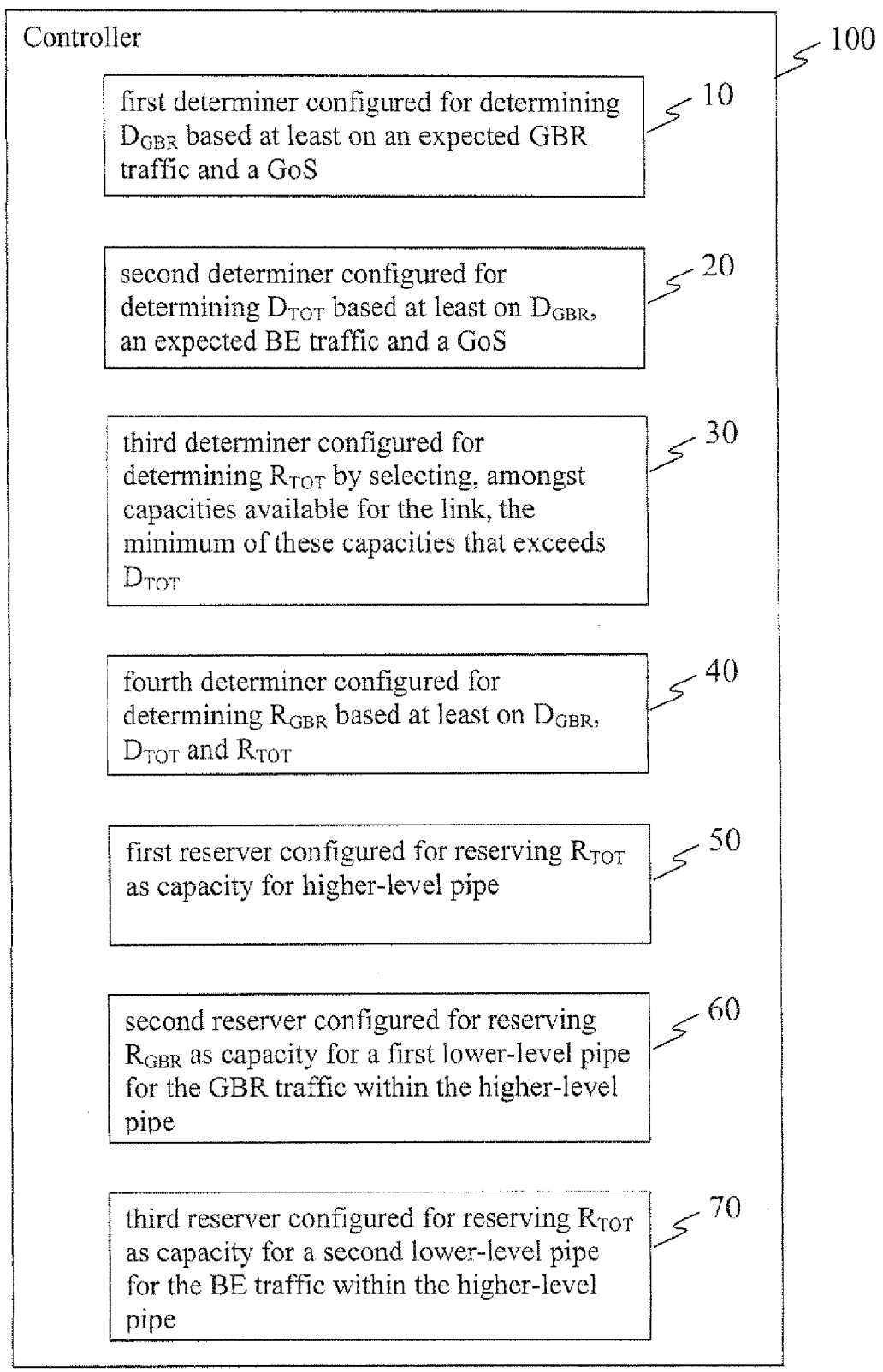
FIG. 14 schematically illustrates a controller in one embodiment of the invention.

FIG. 14 illustrates a controller 100 according to an embodiment of the invention. The controller 100 is configured for reserving capacity on a communication network link for at least a guaranteed bit rate (GBR) traffic and a best effort (BE) traffic.

The controller 100 includes first to fourth determiners 10, 20, 30, 40 and first to third reservers 50, 60, 70. The first determiner 10 is configured for determining a dimensioned capacity $D_{GBR}$ for the GBR traffic based at least on an expected GBR traffic load and a grade of service (GoS). The second determiner 20 is configured for determining a dimensioned capacity $D_{TOT}$ for the total traffic based at least on $D_{GBR}$, an expected BE traffic load and a GoS. The third determiner 30 is configured for determining a reserved capacity $R_{TOT}$ for the total traffic by selecting, amongst capacities available on the communication network link, the minimum of these capacities that exceeds $D_{TOT}$. The fourth determiner 40 is configured for determining a reserved capacity $R_{GBR}$ for the GBR traffic based at least on $D_{GBR}$, $D_{TOT}$ and $R_{TOT}$. The first reserver 50 is configured for reserving $R_{TOT}$ as capacity for a pipe, referred to here as higher-level pipe, on the communication network link. The second reserver 60 is configured for reserving $R_{GBR}$ as capacity for a first lower-level pipe for the GBR traffic within the higher-level pipe. Finally, the third reserver 70 is configured for reserving $R_{TOT}$ as capacity for a second lower-level pipe for the BE traffic within the higher-level pipe.

Physical entities according to embodiments of the invention, such as the controller 100, may comprise or store computer programs including instructions such that, when the computer programs are executed on the physical entity, steps and procedures according to embodiments of the invention are carried out. The invention also relates to such computer programs for carrying out methods according to the invention, and to any computer-readable medium storing the computer programs for carrying out methods according to the invention.

The controller 100 and any of its components may be implemented in hardware, software, field-programmable gate array (FPGA), application-specific integrated circuit (ASICs), firmware or the like.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A computer-implemented method for reserving capacity on a communication network link for at least a guaranteed bit rate traffic and a best effort traffic, the method comprising:
  determining a dimensioned capacity DGBR for the guaranteed bit rate traffic based at least on an expected guaranteed bit rate traffic load and a grade of service;
  determining a dimensioned capacity DTOT for the total traffic based at least on DGBR, an expected best effort traffic load, and the grade of service;

determining a reserved capacity RTOT for the total traffic by selecting a minimum amongst capacities available on the communication network link that exceed DTOT;

determining a reserved capacity RGBR for the guaranteed bit rate traffic based at least on DGBR, DTOT, and RTOT;

reserving RTOT as capacity for a higher-level pipe on the communication network link;

reserving RGBR as capacity for a first lower-level pipe for the guaranteed bit rate traffic within the higher-level pipe; and reserving RTOT as capacity for a second lower-level pipe for the best effort traffic within the higher-level pipe.

2. The method of claim 1 wherein a label switched path is a sequence of routers configured for routing packets each including at least one label, a label of a packet is an identifier physically contiguous to the packet and identifying a forwarding equivalence class to which the packet belongs, and a forwarding equivalence class is a group of packets that are forwarded in the same manner, wherein:
the higher-level pipe is a higher-level label switched path;
the first lower-level pipe is a first lower-level label switched path for guaranteed bit rate traffic; and
the second lower-level pipe is a second lower-level label switched path for best effort traffic.

3. The method of claim 1 wherein:
the higher-level pipe is an aggregated Differentiated Services (DiffServ) pipe;
the first lower-level pipe is a DiffServ pipe for guaranteed bit rate traffic within the aggregated DiffServ pipe; and
the second lower-level pipe is a DiffServ pipe for best effort traffic within the aggregated DiffServ pipe.

4. The method of claim 1 wherein the determining RGBR includes computing RGBR based on the formula $$RGBR = \alpha \cdot RTOT \cdot DGBR/DTOT,$$

where $\alpha$=IGBR/IBE, where IGBR is the expected increase of the guaranteed bit rate traffic over a given period and IBE is the expected increase of the best effort traffic over the given period.

5. The method of claim 1 further comprising:
setting up the higher-level pipe before the reserving RTOT as capacity for the higher-level pipe;
setting up the first lower-level pipe before the reserving RGBR as capacity for the first lower-level pipe;
setting up the second lower-level pipe before the reserving RTOT as capacity for the second lower-level pipe.

6. The method of claim 1 wherein the method is carried out for reserving capacity on the communication network link at one point in time.

7. The method of claim 1 wherein the method is carried out repeatedly for reserving capacity on the communication network link during a period of time.

8. The method of claim 1 wherein the grade of service includes a maximum blocking probability.

9. The method of claim 1 wherein the determining DGBR is further based on at least one quality-of-service parameter.

10. The method of claim 9 wherein the at least one quality-of-service parameter includes at least one of a maximum packet delay and a maximum loss requirement.

11. The method of claim 1 wherein the method is carried out for reserving capacity on the communication network link by reserving the capacity in a network node at one edge of the communication network link.

12. A computer program product stored in a non-transitory computer readable medium for controlling a computer so as to reserve capacity on a communication network link for at least a guaranteed bit rate traffic and a best effort traffic, the computer program product comprising software instructions which, when run on the computer, causes the computer to:
determine a dimensioned capacity (DGBR) for the guaranteed bit rate traffic based at least on an expected guaranteed bit rate traffic load and a grade of service;
determine a dimensioned capacity (DTOT) for the total traffic based at least on DGBR, an expected best effort traffic load, and the grade of service;
determine a reserved capacity (RIOT) for the total traffic by selecting a minimum amongst capacities available on the communication network link that exceed DTOT;
determine a reserved capacity (RGBR) for the guaranteed bit rate traffic based at least on DGBR, DTOT, and RIOT;
reserve RIOT as capacity for a higher-level pipe on the communication network link;
reserve RGBR as capacity for a first lower-level pipe for the guaranteed bit rate traffic within the higher-level pipe; and
reserve RTOT as capacity for a second lower-level pipe for the best effort traffic within the higher-level pipe.

13. A controller configured to reserve capacity on a communication network link for at least a guaranteed bit rate traffic and a best effort traffic, the controller comprising:
a first determiner configured to determine a dimensioned capacity DGBR for the guaranteed bit rate traffic based at least on an expected guaranteed bit rate traffic load and a grade of service;
a second determiner configured to determine a dimensioned capacity DTOT for the total traffic based at least on DGBR, an expected best effort traffic load, and the grade of service;
a third determiner configured to determine a reserved capacity RTOT for the total traffic by selecting a minimum amongst capacities available on the communication network link that exceed DTOT;
a fourth determiner configured to determine a reserved capacity RGBR for the guaranteed bit rate traffic based at least on DGBR, DTOT, and RTOT;
a first reserver configured to reserve RTOT as capacity for a higher-level pipe on the communication network link;
a second reserver configured to reserve RGBR as capacity for a first lower-level pipe for the guaranteed bit rate traffic within the higher-level pipe;
a third reserver configured to reserve RTOT as capacity for a second lower-level pipe for the best effort traffic within the higher-level pipe.

14. A network node configured to handle at least three label switched paths, wherein a label switched path is a sequence of routers configured for routing packets each including at least one label, a label of a packet is an identifier physically contiguous to the packet and identifying a forwarding equivalence class to which the packet belongs, and a forwarding equivalence class is a group of packets that are forwarded in the same manner:
wherein the at least three label switched paths comprise:
a higher-level label switched path with a reserved capacity of RTOT;
a first lower-level label switched path for guaranteed bit rate traffic within the higher-level label switched path with a reserved capacity of RGBR;
a second lower-level label switched path for best effort traffic within the higher-level label switched path with a reserved capacity of RIOT;

wherein:
reserved capacity RTOT is a minimum amongst capacities available on a communication network link that exceed a dimensioned capacity DTOT;
reserved capacity RGBR is based at least on a dimensioned capacity DGBR, dimensioned capacity DTOT, and reserved capacity RTOT;
dimensioned capacity DGBR is based at least on an expected guaranteed bit rate traffic load and a grade of service; and
dimensioned capacity DTOT is based at least on DGBR, an expected best effort traffic load, and the grade of service.

15. A network node configured to handle at least three Differentiated Services (DiffServ) pipes:
wherein the at least three DiffServ pipes comprise:
one higher-level pipe being an aggregated DiffServ pipe with a reserved capacity of RTOT;
one first lower-level pipe being a DiffServ pipe for guaranteed bit rate traffic within the aggregated DiffServ pipe with a reserved capacity of RGBR; and
one second lower-level pipe being a DiffServ pipe for best effort traffic within the aggregated DiffServ pipe with a reserved capacity of RIOT;
wherein:
reserved capacity RIOT is a minimum amongst capacities available on a communication network link that exceed a dimensioned capacity DTOT;
reserved capacity RGBR is based at least on a dimensioned capacity DGBR, dimensioned capacity DTOT and reserved capacity RTOT;
dimensioned capacity DGBR is based at least on an expected guaranteed bit rate traffic load, and a grade of service; and
dimensioned capacity DTOT is based at least on DGBR, an expected best effort traffic load, and the grade of service.

* * * * *